F. J. DAHLBERG.
VALVE STEM.
APPLICATION FILED FEB. 10, 1908.
912,082. Patented Feb. 9, 1909.
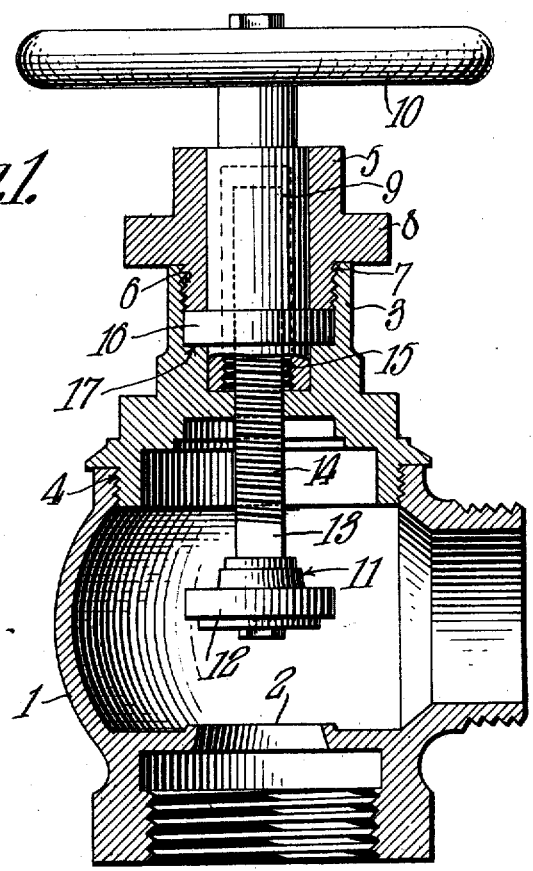
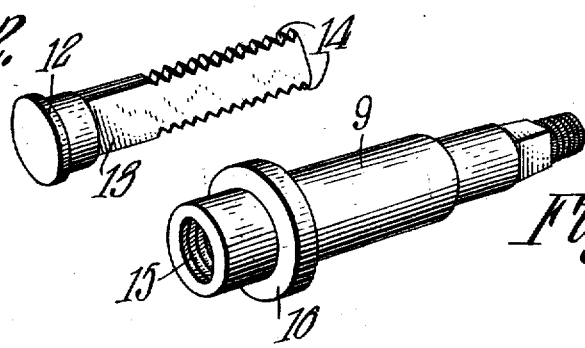
Witnesses
Inventor
Frank J. Dahlberg.
By C. A. Snow & Co.
Attorneys

UNITED STATES PATENT OFFICE.

FRANK JULIUS DAHLBERG, OF REDDING, CALIFORNIA, ASSIGNOR OF ONE-FOURTH TO OSCAR A. CARLSON, OF REDDING, CALIFORNIA.

VALVE-STEM.

No. 912,082.　　　Specification of Letters Patent.　　　Patented Feb. 9, 1909.

Application filed February 10, 1908. Serial No. 415,174.

*To all whom it may concern:*

Be it known that I, FRANK J. DAHLBERG, a citizen of the United States, residing at Redding, in the county of Shasta and State of California, have invented a new and useful Valve-Stem, of which the following is a specification.

This invention relates to valves, and has for its object to render the packing used to prevent leaking in valves unnecessary.

In most valves now in use, a portion of the stem adjacent the casing bonnet is devised to support a series of washers usually of rubber or leather. These are inserted with the stem in the casing, forming a fit, when the casing bonnet is screwed down, tight enough to prevent the liquid or steam escaping through the upper end of the valve stem. These washers last but a short time due to constantly turning the stem when removal or repacking is necessary. The present invention is designed to overcome this defect by providing the stem with a metal head adapted to rest on a shoulder in the valve bonnet, and the usual cap instead of screwing over the exterior of the bonnet, is, in this instance, screwed into the latter, the same being provided with a thread for that purpose. In this position it contacts with one face of the collar proper of the valve stem, while the opposite face of said collar contacts with the shoulder formed in the interior of the valve bonnet. The parts in this position are screwed down tight enough to prevent steam or liquid escaping, but having sufficient play to permit the valve stem to be turned.

In the drawings:—Figure 1 is a section of my improved valve. Fig. 2 is a view of the lower portion of the valve stem. Fig. 3 is a detached view of the upper portion of the valve stem.

Similar numerals of reference are employed to indicate corresponding parts throughout the several figures of the drawings.

1 indicates the globe of the main portion of the valve casing, 2 the seat, 3 is the usual bonnet threaded into the globe as at 4, and 5 is a plug screw threaded as at 6 to fit into the upper portion of the bonnet 3, which is similarly threaded as at 7. On the outer side of the cap 5 is a jam nut, as shown at 8, the lower surface of this jam nut being accurately turned and resting on the end surface of the bonnet 3. The jam nut 8 can be turned on the thread 6 of the cap 5 to force the latter further down in the sleeve for a purpose explained later.

9 is the valve stem provided at its upper end with a hand wheel 10, and 11 indicates the valve, the head 12 terminating in a rectangular stem 13, screw-threaded as at 14, and comprising what is known as a mutilated thread screw which fits in an elongated opening formed in the lower portion of the bonnet 3. The valve stem 9 is internally threaded, as shown at 15, and exteriorly provided intermediate the middle and lower end with a collar 16 formed integral with or otherwise secured to the stem 9. The upper and lower faces of this collar are accurately turned, the lower face resting on a shoulder 17 and the upper face contacting sufficiently with the lower end of the plug 5 to prevent liquid or steam entering there between, but not tight enough to prevent turning of the head. The interior of the bonnet 3 below the thread 7 is bored to a considerably less diameter for a portion of its length, and into this bore snugly fits the lower portion of the valve stem 9, as shown in Fig. 1. The interior threading of the stem 9 is sufficient to accommodate a mutilated screw 14, so that when the wheel 10 is turned, turning therewith the stem 9, the valve 11 is raised or lowered.

The arrangement of the parts as shown in Fig. 1 is such that the escape of steam through the upper end of the bonnet 3 is less likely to occur than in valves where packing used has become worn, since it is well known that in such valves unless the packing used is frequently renewed, the parts become worn and the excess of escape of steam naturally ensues.

It will be noted that after long use should either of the faces of the collar 16 or the surfaces with which it contacts become worn, the parts may be adjusted to the required fit by turning the jam nut 8 to a lower position on the cap 5.

I claim:—

In a valve of the character described, the combination of a casing, a bonnet fitting into said casing and interiorly provided with a pair of shoulders one of which is disposed at approximately the intermediate portion of said bonnet and the other adjacent the outer end, a valve stem within said bonnet having its inner extremity bearing on the first named shoulder, said valve stem being provided with a collar one face of which is adapted to bear on the second named shoulder a plug encircling said valve stem and adapted to enter the outer end of said bonnet so as to bear on the opposed face of said collar.

In testimony that I claim the foregoing as my own, I have hereto affixed my signature in the presence of two witnesses.

FRANK JULIUS DAHLBERG.

Witnesses:
WM. T. MARWICK,
CHAS. HORNLAND.